Nov. 16, 1926.    1,607,323
C. C. VAN NUYS
SEPARATION OF THE CONSTITUENTS OF TERNARY GASEOUS MIXTURES
Filed July 11, 1925
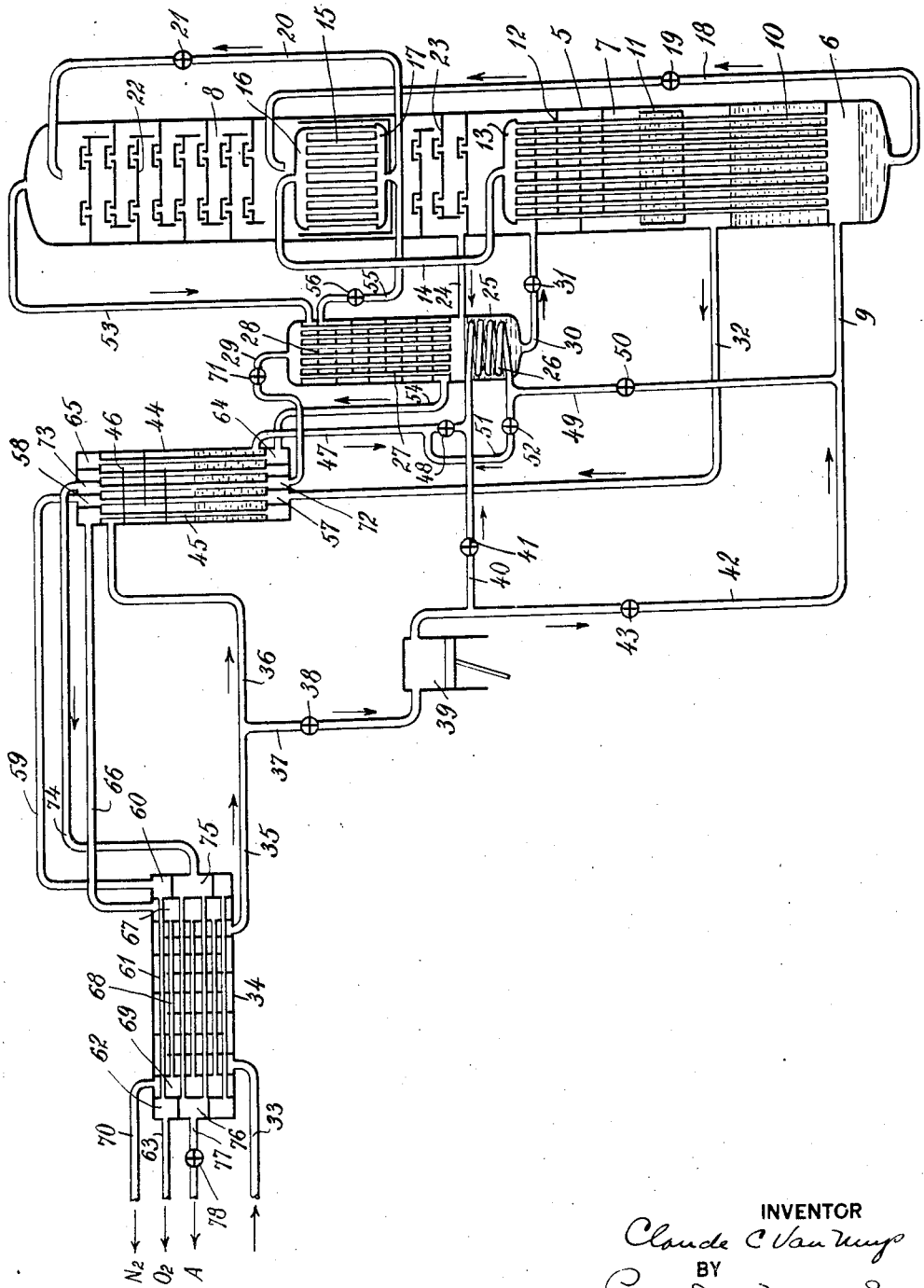
INVENTOR
Claude C Van Nuys
BY
Pennie Davis Marvin & Edmonds
his ATTORNEYS Patented Nov. 16, 1926.

1,607,323

UNITED STATES PATENT OFFICE.

CLAUDE C. VAN NUYS, OF CRANFORD, NEW JERSEY, ASSIGNOR TO AIR REDUCTION COMPANY, INCORPORATED, OF NEW YORK, N. Y., A CORPORATION OF NEW YORK.

SEPARATION OF THE CONSTITUENTS OF TERNARY GASEOUS MIXTURES.

Application filed July 11, 1925. Serial No. 42,898.

This invention relates to the separation of the constituents of ternary gaseous mixtures, being adaptable more particularly for the separation of the elements of atmospheric air. For the purpose of this application the air will be considered as consisting of approximately 20.8% of oxygen, 78.2% of nitrogen and 1% of argon by volume, thus discarding the minute quantities of the rarer elements which do not affect materially the composition of the products obtained in the separation of oxygen and the other more important constituents from air.

There are several well known methods of separating atmospheric air into oxygen and nitrogen by first compressing and cooling the air, causing liquefaction of all or a part thereof and subsequently rectifying the liquid produced by causing vapors therefrom to travel counter-current to a stream of the liquid in an apparatus known as a rectifier or a rectification column. Usually no attention is given to the argon content of the air amounting to about 1% by volume. Argon has a boiling point about 3° below that of oxygen and about 10° above that of nitrogen. Consequently in the rectification the argon tends to follow the oxygen to the lower levels of the rectifier and thus contaminates the oxygen product, reducing its purity to a very considerable extent. If the attempt is made to overcome this tendency by causing a greater volume of vapor to ascend in the rectifier the quantity of the oxygen product at the lower end of the rectifier is decreased owing to the loss of oxygen with the nitrogen effluent at the top of the rectifier. Improvement in the quality of the oxygen is obtained thus only at a considerable sacrifice in the yield.

It is known that the concentration of argon in both the liquid and vapors increases materially at a certain level in the rectification column. Advantage has been taken of this fact to separate argon. In one case the vapor is withdrawn at the lower level of the rectification column and is subjected to cooling in a coil or other heat exchanger with which colder liquids at higher levels of the rectification column are in contact. This causes a separation of a portion of the oxygen present in the vapor and produces a gaseous mixture of oxygen and argon with slight traces of nitrogen, the mixture being richer than the vapors withdrawn. This method does not, however, accomplish the purpose of improving the purity of the oxygen liquid accumulating at the bottom of the rectifier to any considerable extent because a large portion of the argon remains in the liquid and consequently is not withdrawn. Another method involves the withdrawal of all of the liquid from the bottom of the rectification column and the further treatment thereof in an auxiliary rectification column where the liquid is subjected to vapors rising from the accumulated body of liquid oxygen. To ensure the most complete separation it is necessary to withdraw and recompress the effluent from the auxiliary column. This method involves the additional expense of providing and maintaining the auxiliary column and the cost of recompressing the effluent therefrom. While it produces an oxygen product of very high purity which is substantially free from argon, the additional expense is not warranted in every instance and in any case must be considered as unnecessary when it is possible to separate argon without resorting to the auxiliary column.

It is the object of the present invention to provide a simple and effective method of and apparatus for separating ternary gaseous mixtures, and particularly for the production of substantially pure oxygen and incidentally a gas consisting substantially of argon. The method and apparatus hereinafter described avoid the difficulties and the incidental expenses heretofore mentioned because the apparatus employed is inexpensive and requires no application of power to maintain the operation.

The invention depends upon the enrichment in argon of the liquid accumulated in the lower portion of an ordinary rectification column, and in carrying out the invention this liquid rather than the vapor therefrom is withdrawn from the level of the rectification column where the highest enrichment in argon occurs and is vaporized by heat exchange with all or a portion of the incoming gaseous mixture. The vapors thus produced are subjected to selective liquefaction by heat exchange with cold products from the rectification column to effect the condensation of the oxygen present. The vapors which are not condensed consist of argon and a very slight proportion of nitrogen which is present in the liquid at the level from which it is withdrawn in the rectification column. The liquid formed by selective liquefaction is substantially higher in oxygen than the vapor and this is returned to the rectification column for revaporization to produce the pure oxygen product of the operation.

For example, in the operation of the method all or a portion of the liquid can be withdrawn from the lower level of the rectification column at which point the liquid contains substantially no nitrogen and consists of oxygen with a considerable proportion of argon. This liquid passes into a chamber where it is heated by means of a coil through which all or a portion of the incoming air is passed. This air, having been previously compressed and cooled, is in a condition for liquefaction by the application of refrigeration. It is still warmer than the liquid which is withdrawn from the lower level of the rectification column and hence will cause the vaporization of the argon-containing liquid. In systems employing expansion engines and liquefiers in which a portion of the incoming compressed and cooled air passes through the engine for expansion while the other passes through the liquefier, the air which is delivered to the coil to evaporate the argon-containing liquid may be all or a portion of the exhaust from the engine or all or a portion of the air which has passed through the liquefier. Alternately, the air from both the engine and the liquefier can be diverted in the desired proportions to the coil, it being essential only that the coil be supplied with the proper quantity of the incoming gaseous mixture to evaporate the argon-containing liquid which is withdrawn from the rectification column. The vapor which is produced by heat exchange between the incoming gaseous mixture and the argon enriched liquid rises through a suitable exchanger consisting preferably of a plurality of tubes about which cold products from the rectification column are circulated. The effluent nitrogen from the top of the rectification column can be employed for this purpose or a portion of the liquid reflux nitrogen can be used similarly. Both of these products can be used in combination to ensure the required degree of refrigeration about the tubes so that substantially all of the oxygen is liquefied as the vapors rise through the tubes, leaving only the unliquefied argon to escape from the top of the tubes. The liquid oxygen produced by selective liquefaction in the tubes returns and mixes with the argon enriched liquid delivered from the rectification column and a portion of the accumulated body of liquid from which substantially all of the argon has been separated is delivered continuously to the rectification column and surrounds the tubes in the vaporizer section thereof where the incoming air is subjected to selective liquefaction to accomplish the primary separation of the constituents. In systems where the air is wholly liquefied instead of being subjected to selective liquefaction, the argon-free liquid will surround the coils or other heat exchangers where the liquefaction of the air is effected.

In addition to the removal of the argon in a simple and effective way and the consequent production of substantially pure oxygen to the full capacity of the apparatus used, the method has an additional advantage particularly where an expansion engine is employed. In expanding in the engine the air is cooled to a material extent, the engine being used in fact to make up the refrigerative losses which are due to the leakage of heat into the system. The engine exhaust, nevertheless, contains a surplus of heat which may be termed "superheat". If the exhaust is delivered directly to the vaporizer of the column where it passes in indirect contact with the surrounding body of accumulated liquid oxygen, it will because of the presence of "superheat" vaporize a greater volume of liquid than the volume produced in the tubes of the vaporizer by the interchange of heat. This requires the use of an external liquefier in order to ensure the maintenance of a suitable volume of liquid in the column at all times. By passing the effluent from the engine through the coil in contact with the argon-enriched liquid from the rectifier, heat is removed from the incoming gaseous mixture and it is brought more nearly to the temperature at which condensation occurs. The removal of "superheat" from the engine exhaust in this way avoids the introduction of surplus heat to the vaporizer and consequently the excessive vaporization of the liquid surrounding the tubes therein. The amount of compensating liquid to be produced in the liquefier is accordingly reduced. Moreover, since the outgoing effluent products are warmed by selective liquefaction of the argon containing vapors the quantity of liquid produced in the liquefier is reduced substantially, thus balancing the operation and ensuring the most economical and effective application of refrigeration in the system.

The preferred type of apparatus is diagrammatically illustrated in the accompanying drawing. The details of the apparatus such as are well known to those skilled in the art are omitted for the purpose of clarity. It is to be understood, moreover, that the invention is applicable in a variety of types of apparatus and in various modifications of the known methods of separating the constituents of gaseous mixtures as hereinbefore mentioned.

Referring to the drawing, 5 indicates a column having a lower compartment 6, a vaporizing compartment 7 and a rectifier 8. The entering gaseous mixture such as air is delivered to the compartment 6 through a pipe 9 and passes upwardly through a plurality of tubes 10 in indirect contact with bodies of liquid accumulating in the bottom of the compartment, in a receptacle 11 and upon trays 12. In passing through the tubes the gaseous mixture is subjected to selective liquefaction, and in case air is treated a liquid returns through the tubes and accumulates in the compartment 6. This liquid contains approximately 47% of oxygen, the balance being nitrogen and argon. The unliquefied residual gas which consists substantially of nitrogen, passes from the tubes 10 to a header 13 and thence through a pipe 14 to a condenser consisting of a plurality of tubes 15 terminating in headers 16 and 17. The purpose of this condenser is to liquefy the residual nitrogen gas which serves as a reflux liquid in the rectification column. The liquefaction of the nitrogen is accomplished by contact with liquid flowing downwardly through the column, a portion of which is delivered to the compartment 8 through a pipe 18 and pressure-reducing valve 19. This liquid, together with the liquid nitrogen which is delivered from the header 17 through a pipe 20 and pressure-reducing valve 21, flows over a plurality of trays 22 and 23 of the usual type employed in rectification columns in contact with vapors rising through the column from the compartment 7. These vapors are formed by the heat exchange between the liquid in the compartment 7 and the entering gaseous mixture in the tubes 10.

At a certain level in the rectification column, for example at the lowermost tray 23, the liquid consists substantially of oxygen and argon, the accumulation of these elements in the liquid being due to the rectifying effect of the rising vapors which evaporate nitrogen from the descending liquid and replace the nitrogen with oxygen and argon. The argon enriched liquid is withdrawn from the column through a pipe 24 and is delivered to an auxiliary vaporizer 25 including a coil 26 and a plurality of tubes 27. The liquid surrounds the coil 26 and is vaporized by heat exchange with a warm gaseous mixture supplied to the coil as hereinafter described. The vapors rise through the tubes 27 and are subjected to heat exchange with colder products from the rectification column delivered thereto as hereinafter described and passing about a plurality of baffles 28 to ensure thorough contact of the products with the tubes. The heat exchange causes a selective liquefaction of the vapors so that oxygen is separated therefrom in the form of a liquid and returns through the tubes to the body of liquid surrounding the coil. The unliquefied gaseous residue from the tubes 27 escapes from the top of the auxiliary vaporizer through a pipe 29. The liquid accumulating about the coil 26 in the bottom of the auxiliary vaporizer is delivered by a pipe 30 controlled by a valve 31 to the compartment 7 of the column and accumulates in the bottom of this compartment where it is vaporized eventually, the vapor escaping through a pipe 32 and constituting the pure oxygen product of the operation while the gas escaping through the pipe 29 contains a high proportion of argon, it being assumed that the mixture treated is atmospheric air.

The entering gaseous mixture, for example air, is compressed in a suitable compressor provided with the usual water cooling devices and is delivered through a pipe 33 to an exchanger 34 through which it passes in heat-exchanging relation with outgoing products of the operation. After passing through the exchanger the air is delivered through a pipe 35 to branches 36 and 37. The branch 37 delivers a portion of the gaseous mixture under control of a valve 38 to an expansion engine 39 where it is expanded with external work and thereby cooled. The exhaust from the engine is delivered through a pipe 40 controlled by a valve 41 to the coil 26 in the auxiliary vaporizer 25 and serves as hereinbefore indicated to vaporize the argon enriched liquid from the rectifier. A portion of the exhaust can be delivered through a pipe 42 controlled by a valve 43 to the pipe 9 which conveys it to the compartment 6 at the bottom of the column. The other branch 36 delivers a portion of the incoming gaseous mixture to a liquefier 44 comprising a shell which encloses a plurality of tubes 45 through which cold products of the column pass on their way to the exchanger 34. The incoming gaseous mixture is cooled in passing about the tubes and baffles 46 within the liquefier and is thus partially liquefied. The liquid and vapors are delivered from the liquefier through a pipe 47 and all or a portion thereof can be delivered under control of a valve 48 to the pipe 40 and thus conveyed to the coil 26. After passing through the coil 26 the entering gaseous mixture, whether derived from the expansion engine or the liquefier or both, is delivered through a pipe 49 controlled by a valve 50 to the pipe 9 and passes thus to the compartment 6 at the bottom of the column. A by-pass 51 controlled by a valve 52 permits delivery of the entering gaseous mixture from the liquefier directly to the pipe 49 without passing through the coil 26.

The effluent nitrogen from the top of the rectifier escapes through a pipe 53 and is delivered thereby to the auxiliary vaporizer 25. It passes about the baffles 28 and the tubes 27 therein and is delivered by a pipe 54 to the liquefier 44. Alternatively or in addition to the effluent nitrogen, liquid nitrogen produced in the tubes 15 can be delivered through a pipe 55 controlled by a valve 56 to the auxiliary vaporizer 25. This liquid is vaporized in passing through the auxiliary vaporizer and escapes through the pipe 54.

The various cold products pass through the liquefier 44 for the purpose of cooling the incoming gaseous mixture. Thus the pipe 32 which delivers the pure oxygen product communicates with a compartment 57 at one end of the liquefier and the gas passes through the tubes 45 therein to a corresponding compartment 58 at the opposite end of the liquefier. Thence the oxygen passes through a pipe 59 to a compartment 60 at one end of the exchanger 34. Tubes 61 convey the oxygen through the exchanger in heat exchange relation with the entering gaseous mixture to a compartment 62 at the opposite end of the exchanger. Thence the oxygen escapes through a pipe 63. The effluent nitrogen and the vaporized liquid nitrogen from the pipe 54 enter a compartment 64 at one end of the liquefier and pass through the tubes 45 to a corresponding compartment 65. Thence the nitrogen is delivered through a pipe 66 to a compartment 67 at one end of the exchanger 34. Thence the nitrogen passes through tubes 68 to a compartment 69 at the other end of the exchanger and escapes through a pipe 70. The argon is delivered from the pipe 29 under control of a valve 71 to a compartment 72 at one end of the liquefier 44 and passes through the tubes 45 thereof to a compartment 73 at the opposite end thereof. Thence the argon is delivered through a pipe 74 to a compartment 75 at one end of the exchanger 34 and passes through tubes 61 therein to a compartment 76 at the opposite end of the exchanger. The argon is withdrawn through a pipe 77 under control of a valve 78. The various products may be delivered from the exchanger to suitable receptacles or discharged to the atmosphere as described.

As will be understood from the foregoing description, the method as set forth permits the separation of substantially all of the argon from atmospheric air and the production consequently of oxygen of high purity without reducing the yield of the apparatus. This is accomplished, moreover, without resorting to expensive auxiliary rectification apparatus and the application of power for recompression of the vapor. The method conserves likewise the refrigerative effect and maintains the heat balance of the system, thus ensuring the most effective operation. While it is designed primarily for the treatment of atmospheric air, the method and apparatus can be utilized to separate other ternary gaseous mixtures in which the constituents bear relations similar to those existing between the principal elements of the atmosphere.

Various changes may be made in the details of operation of the method and especially in the apparatus used without departing from the invention or sacrificing any of the advantages thereof.

I claim:

1. The method of separating the constituents of ternary gaseous mixtures, which comprises liquefying and partially separating the mixture into a gas consisting principally of the most volatile constituent and a liquid containing the less volatile constituents, withdrawing the liquid and subjecting it to selective evaporation by heat exchange with the entering gaseous mixture to remove the constituent of intermediate volatility, returning the remaining liquid consisting principally of the least volatile element and utilizing it to refrigerate the entering gaseous mixture.

2. The method of separating the constituents of ternary gaseous mixtures, which comprises liquefying and partially separating the mixture into a gas consisting principally of the most volatile constituent and a liquid containing the less volatile constituents, withdrawing the liquid and subjecting it to selective evaporation by heat exchange with the entering gaseous mixture, and subjecting the vapors thus produced to selective liquefaction to remove the constituent of intermediate volatility, returning the remaining liquid consisting principally of the least volatile element and utilizing it to refrigerate the entering gaseous mixture.

3. The method of separating the constituents of ternary gaseous mixtures, which comprises liquefying and partially separating the mixture into a gas consisting principally of the most volatile constituent and a liquid containing the less volatile constituents, withdrawing the liquid and subjecting it to selective evaporation by heat exchange with the entering gaseous mixture, and subjecting the vapors thus produced to selective liquefaction by heat exchange with cold products of the primary separation to remove the constituent of intermediate volatility, returning the remaining liquid consisting principally of the least volatile element and utilizing it to refrigerate the entering gaseous mixture.

4. The method of separating the constituents of ternary gaseous mixtures, which comprises separating from a liquid containing all of the constituents by rectification a gas consisting principally of the most volatile constituent and a liquid containing the less volatile constituents, partially evaporating the latter liquid by heat exchange with the entering gaseous mixture to remove the constituent of intermediate volatility, separately withdrawing the vapor and finally vaporizing the resulting liquid.

5. The method of separating the constituents of ternary gaseous mixtures, which comprises separating from a liquid containing all of the constituents by rectification a gas consisting principally of the most volatile constituent and a liquid containing the less volatile constituents, partially evaporating the latter liquid by heat exchange with the entering gaseous mixture and subjecting the vapors thus produced to selective liquefaction to remove the constituent of intermediate volatility, separately withdrawing that constituent and finally vaporizing the resulting liquid.

6. The method of separating the constituents of ternary gaseous mixtures, which comprises separating from a liquid containing all of the constituents by rectification a gas consisting principally of the most volatile constituent and a liquid containing the less volatile constituents, partially evaporating the latter liquid by heat exchange with the entering gaseous mixture and subjecting the vapors thus produced to selective liquefaction by heat exchange with cold products of the rectification to remove the constituent of intermediate volatility, separately withdrawing that constituent and finally vaporizing the resulting liquid.

7. The method of separating the constituents of ternary gaseous mixtures, which comprises rectifying a liquid containing all of the constituents, withdrawing the liquid product of the rectification, subjecting it to selective evaporation by heat exchange with the gaseous mixture and finally evaporating the residual liquid.

8. The method of separating the constituents of ternary gaseo mixtures, which comprises rectifying a liquid containing all of the constituents, withdrawing the liquid product of the rectification, subjecting it to selective evaporation by heat exchange with the gaseous mixture, subjecting the vapors produced to selective liquefaction with backward return of the liquid produced and finally evaporating the residual liquid.

9. The method of separating the constituents of ternary gaseous mixtures, which comprises rectifying a liquid containing all of the constituents, withdrawing the liquid product of the rectification, subjecting it to selective evaporation by heat exchange with the gaseous mixture, subjecting the vapors produced to selective liquefaction by heat exchange with cold products of the rectification with backward return of the liquid produced and finally evaporating the residual liquid.

10. The method of separating the constituents of gaseous mixtures, which comprises compressing the gaseous mixture, subjecting it to selective liquefaction and rectification, the gaseous mixture being cooled before selective liquefaction thereof by heat exchange with a liquid product of the rectification.

11. The method of separating the constituents of gaseous mixtures, which comprises compressing the gaseous mixture, expanding it with external work, subjecting the expanded gaseous mixture to selective liquefaction and rectification, the expanded gaseous mixture being cooled before selective liquefaction thereof by heat exchange with a liquid product of the rectification.

12. The method of separating argon from air, which comprises rectifying a liquid containing the constituents of air to obtain a liquid rich in oxygen and argon and selectively evaporating the argon-containing liquid to remove the argon therefrom by heat exchange with the incoming air and finally evaporating the residual liquid rich in oxygen.

13. The method of separating argon from air, which comprises rectifying a liquid containing the constituents of air to obtain a liquid rich in oxygen and argon, selectively evaporating the argon-containing liquid to remove the argon therefrom by heat exchange with the incoming air, cooling the vapors containing argon to separate oxygen therefrom by liquefaction thereof and finally evaporating the residual liquid rich in oxygen.

14. The method of separating argon from air, which comprises liquefying and rectifying the air to separate nitrogen therefrom, thereby producing a liquid rich in oxygen and argon, selectively evaporating the argon-containing liquid by heat exchange with the incoming air and utilizing the remaining oxygen liquid to liquefy the air.

15. The method of separating argon from air, which comprises liquefying and rectifying the air to separate nitrogen therefrom, thereby producing a liquid rich in oxygen and argon, selectively evaporating the argon-containing liquid by heat exchange with the incoming air, cooling the vapors containing argon to separate oxygen therefrom by liquefaction thereof and utilizing the remaining oxygen liquid to liquefy the air.

In testimony whereof I affix my signature.

CLAUDE C. VAN NUYS.